US008206601B2

(12) United States Patent
Bosworth et al.

(10) Patent No.: US 8,206,601 B2
(45) Date of Patent: Jun. 26, 2012

(54) SUPPORTING MEMBRANES ON NANOMETER-SCALE SELF-ASSEMBLED FILMS

(75) Inventors: Joan K. Bosworth, San Jose, CA (US); Elizabeth A. Dobisz, San Jose, CA (US); Ricardo Ruiz, San Bruno, CA (US); Franck D. Rose dit Rose, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 290 days.

(21) Appl. No.: 12/641,782

(22) Filed: Dec. 18, 2009

(65) Prior Publication Data

US 2011/0151236 A1    Jun. 23, 2011

(51) Int. Cl.
*B44C 1/22* (2006.01)
(52) U.S. Cl. ............ 216/11; 216/41; 216/56; 216/83
(58) Field of Classification Search .......... 216/11, 216/41, 56, 83
See application file for complete search history.

(56) References Cited

U.S. PATENT DOCUMENTS

| | | | |
|---|---|---|---|
| 6,541,539 B1 | 4/2003 | Yang et al. ............. 523/200 |
| 7,115,305 B2 | 10/2006 | Bronikowski et al. ..... 427/249.1 |
| 7,419,772 B2 | 9/2008 | Watkins et al. ............ 430/325 |
| 7,569,469 B2 | 8/2009 | Kim et al. ............... 438/597 |
| 7,976,715 B2 | 7/2011 | Dobisz et al. |
| 2005/0224923 A1* | 10/2005 | Daley et al. ............. 257/642 |
| 2007/0197014 A1* | 8/2007 | Jeon et al. .............. 438/597 |
| 2007/0289943 A1 | 12/2007 | Lu et al. ................ 216/41 |
| 2008/0230514 A1 | 9/2008 | Park et al. .............. 216/41 |
| 2008/0233343 A1 | 9/2008 | Cheng et al. ............. 428/114 |
| 2008/0286659 A1 | 11/2008 | Millward ................. 430/5 |
| 2008/0290067 A1 | 11/2008 | Yoshida et al. ............ 216/49 |
| 2009/0078673 A1 | 3/2009 | Kihara et al. ............. 216/11 |
| 2009/0108341 A1* | 4/2009 | Chung ................... 257/329 |
| 2009/0229637 A1* | 9/2009 | Yun et al. ................ 134/21 |
| 2009/0308837 A1 | 12/2009 | Albrecht et al. |
| 2010/0165512 A1 | 7/2010 | Albrecht et al. |

OTHER PUBLICATIONS

R. Ruiz, H. Kang, F. A. Detcheverry, E. Dobisz, D. S. Kercher, T. R., "Density Multiplication and Improved Lithography by Directed Block Copolymer Assembly", Albrecht, J. J. de Pablo, P. F. Nealey, *Science* 2008, 321,936.
M. P. Stoykovich, M. Muller, S. O. Kim, H. H. Solak, E. W. Edwards, J. J. de Pablo, P. F. Nealey, "Directed Assembly of Block Copolymer Blends Into Nonregular Device-Oriented Structures" *Science* 2005, 308 , 1442.

(Continued)

*Primary Examiner* — Shamim Ahmed
(74) *Attorney, Agent, or Firm* — Zilka-Kotab, PC

(57) ABSTRACT

Block copolymer lithography has emerged as an alternative lithographic method to achieve large-area, high-density patterns at resolutions near or beyond the limit of conventional lithographic techniques for the formation of bit patterned media and discrete track media. In one embodiment, a structure comprises a plurality of nanostructures extending upwardly from a substrate and a porous membrane extending across upper ends of the plurality of nanostructures. A method, according to another embodiment, comprises forming a block copolymer layer on a substrate, inducing self assembly of the block copolymer layer, selectively degrading a block polymer from the block copolymer layer, forming a porous membrane over the block copolymer layer, and removing a portion of the block copolymer layer for defining a plurality of nanostructures extending upwardly from the substrate after forming the porous membrane over the block copolymer layer. Other systems and methods are disclosed as well.

16 Claims, 13 Drawing Sheets

OTHER PUBLICATIONS

S. O. Kim, H. H. Solak, M. P. Stoykovich, N. F. Ferrier, J. J. de Pablo, P. F. Nealey, "Epitaxial self-assembly of block copolymers on lithographically defined nanopatterned substrates", *Nature* 2003, 424, 411.

E. W. Edwards, M. Muller, M. P. Stoykovich, H. H. Solak, J. J. de Pablo, P. F. Nealey, "Dimensions of Shapes of Block Copolymer Domains Assembled on Lithographically Defined Chemically Patterned Substrates", *Macromolecules* 2007, 40, 90.

S. M. Park, P. Ravindran, Y. H. La, G. S. W. Craig, N. J. Ferrier, P. F. Nealey, "Combinatorial Generation and Replication-Directed Assembly of Complex and Varied Geometries with Thin Films of Diblock Copolymers", *Langmuir* 2007, 23, 9037.

R. Ruiz, R. L. Sandstrom, C. T. Black, "Induced Orientational Order in Symmetric Diblock Copolymer Thin Films", *Advanced Materials* 2007, 19, 587.

C. T. Black, R. Ruiz, G. Breyta, J. Y. Cheng, M. C. Colburn, K. W. Guarini, H.-C. Kim, Y. Zhang, "Polymer self assembly in semiconduct microelectronics", *IBM Journal of Research and Development* 2007, 51, 605.

P. Mansky, Y. Liu, E. Huang, T. P. Russell, C. Hawker, *Science* 1997, 275, 1458. S. O. Kim, H. H. Solak, M. P. Stoykovich, N. J. Ferrier, J. J. de Pablo, P. F. Nealey, "Controlling Polymer-Surface Interactions with Random Copolymer Brushes", *Nature* 2003, 424, 411.

Soojin Park et al., "A Simple Route to Highly Oriented and Ordered Nanoporous Block Copolymer Templates" American Chemical Society, vol. 2, No. 4, www.acsnano.org.

T. Thurn-Albrecht et al., "Ultrahigh-Density Nanowire Arrays Grown in Self-Assembled Diblock Copolymer Templates" Science, vol. 290, Dec. 15, 2000, www.sciencemag.org.

Miri Park et al., "Block Copolylmer Lithography: Peridoic Array of ~$10^{11}$ Holes in 1 Square Centimeter" Science, vol. 276, May 30, 1997, www.sciencemag.org.

\* cited by examiner

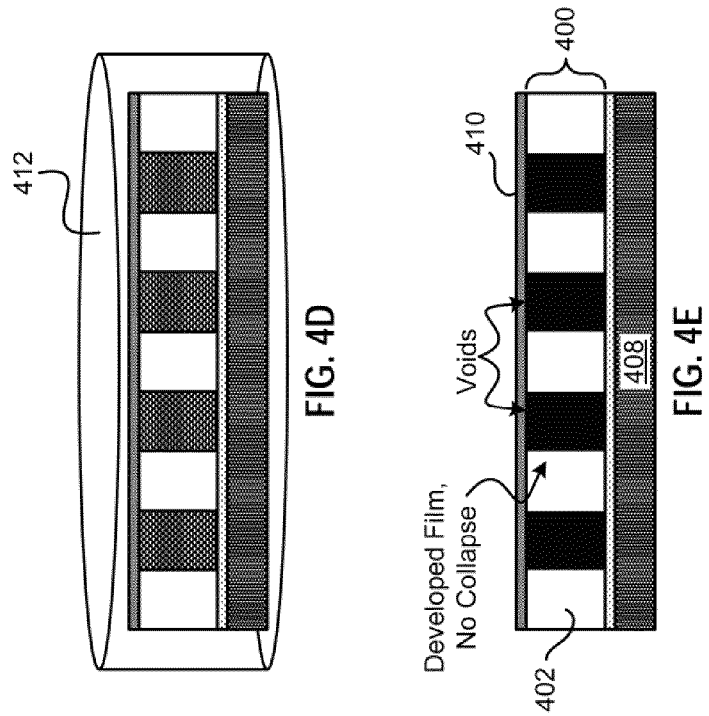
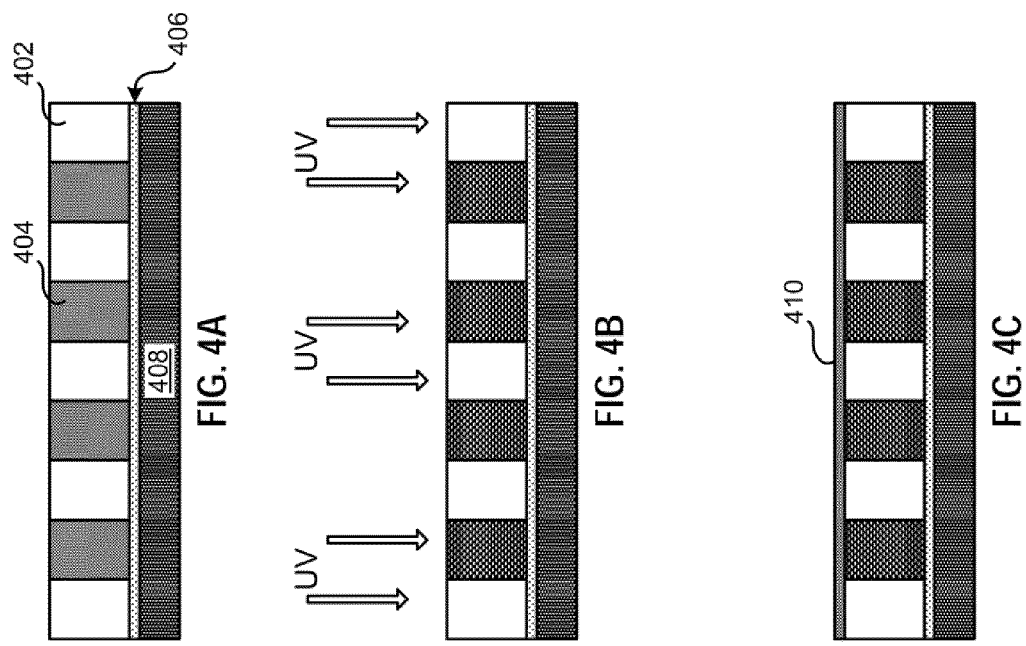

Top-Down View

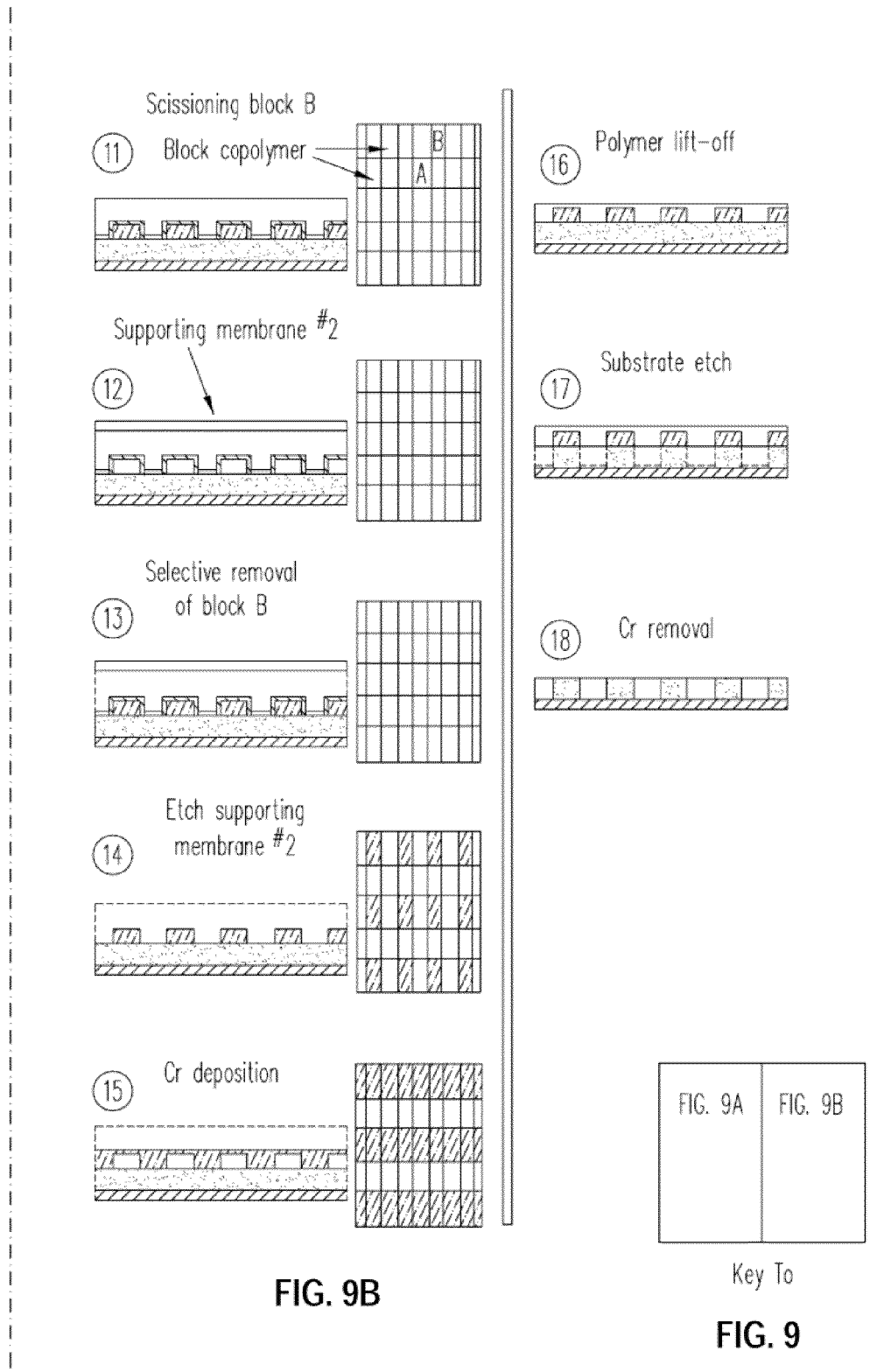

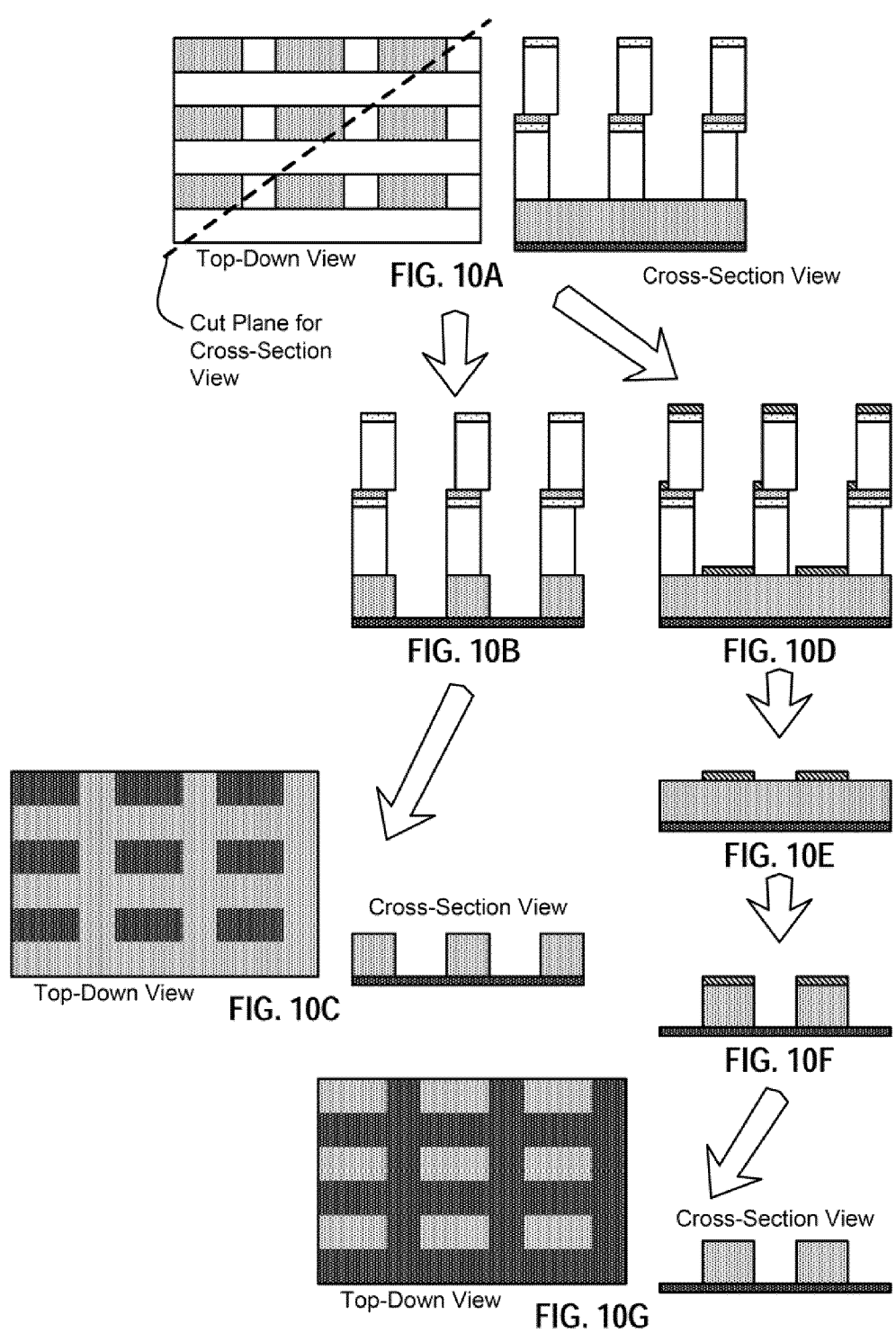

SUPPORTING MEMBRANES ON NANOMETER-SCALE SELF-ASSEMBLED FILMS

FIELD OF THE INVENTION

The present invention relates to nanometer-scale self-assembled structures, and more particularly, this invention relates to nanometer-scale self-assembled films having supporting membranes on top at least during the fabrication thereof.

BACKGROUND OF THE INVENTION

Block copolymer lithography has emerged as an alternative lithographic method to achieve large-area, high-density patterns at resolutions near or beyond the limit of conventional lithographic techniques. Block copolymers are polymeric chains formed by two or more immiscible polymer blocks within the same chain. Free energy minimization induces micro-phase separation of the immiscible, but bonded, blocks, resulting in self-assembled periodic and regular patterns. Thin films of block copolymers can form 2-dimensional arrays of regular, periodic patterns on a substrate. Upon selective removal of one of the block materials from an assembled block copolymer thin film, the remaining portion of the film can act as a lithographic mask. The most commonly used block copolymer structures for lithographic applications are thin films of spherical, cylindrical or lamellar domains with cylindrical and lamellar patterns perpendicularly oriented with respect to the surface of the substrate.

Selective removal of one of the constituent blocks is usually accomplished by a wet developing process where one block is selectively degraded and then the sample is immersed in a selective solvent that dissolves only the degraded block, leaving the other block unchanged. Upon drying, the undissolved block stays on the substrate forming a suitable mask for lithography. However, pattern collapse is a common problem during the drying step for critical dimensions under about 30 nm. A possible solution to pattern collapse in lamellar phase block copolymer has previously been achieved by performing a dry developing step in which oxygen plasma is used to etch away one of the two blocks. However, the etch selectivity is poor and as the material to be removed is etched away, the block that is intended to remain also etches down resulting in a thin, rounded mask that is not adequate for high fidelity lithography. A wet developing process that preserves the entire structure of the undissolved material is preferred if pattern collapse can be avoided.

Achieving 3-dimensional structures suitable for lithography (e.g., with selective removal of one material from the 3-dimensional stack) has also remained a challenge for self-assembly.

SUMMARY OF THE INVENTION

In one embodiment, a structure comprises a plurality of nanostructures extending upwardly from a substrate and a porous membrane extending across upper ends of the plurality of nanostructures.

A method, according to another embodiment, comprises forming a block copolymer layer on a substrate, inducing self assembly of the block copolymer layer, selectively degrading a block polymer from the block copolymer layer, forming a porous membrane over the block copolymer layer, and removing a portion of the block copolymer layer for defining a plurality of nanostructures extending upwardly from the substrate after forming the porous membrane over the block copolymer layer.

In yet another embodiment, a method comprises forming a first block copolymer layer on a first surface modification layer, the first surface modification layer causing the block copolymer layer to become oriented in a first defined way, selectively degrading a first block polymer from the first block copolymer layer, forming a first porous membrane over the first block copolymer layer, removing a portion of the first block copolymer layer for defining a plurality of first nanostructures extending upwardly from the first surface modification layer after forming the first porous membrane over the first block copolymer layer, removing the first porous membrane, depositing a first masking material over the plurality of first nanostructures and the first surface modification layer, removing the plurality of first nanostructures for forming a first patterned mask of the first masking material, forming a second surface modification layer above the patterned mask, forming a second block copolymer layer on the second surface modification layer, the second surface modification layer causing the second block copolymer layer to become oriented in a second defined way different from the first defined way associated with the first surface modification layer, forming a second porous membrane over the second block copolymer layer, removing a portion of the second block copolymer layer for defining a plurality of second nanostructures after forming the second porous membrane over the second block copolymer layer, and removing the second porous membrane.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head. In addition, embodiments may be used for lithography for semiconductor materials, for 3D device integration, for optical devices, photovoltaic cells, membranes for microfluidic applications, etc.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIGS. 4A-4E are schematic representations progressively showing the formation of lamellae-forming block copolymer films after selective removal of one block copolymer, according to one embodiment.

FIGS. 10A-10G show schematic representations of pattern transfer using a double layer stack to produce hole-type and pillar type templates, according to some embodiments.

DETAILED DESCRIPTION

Figure 1:
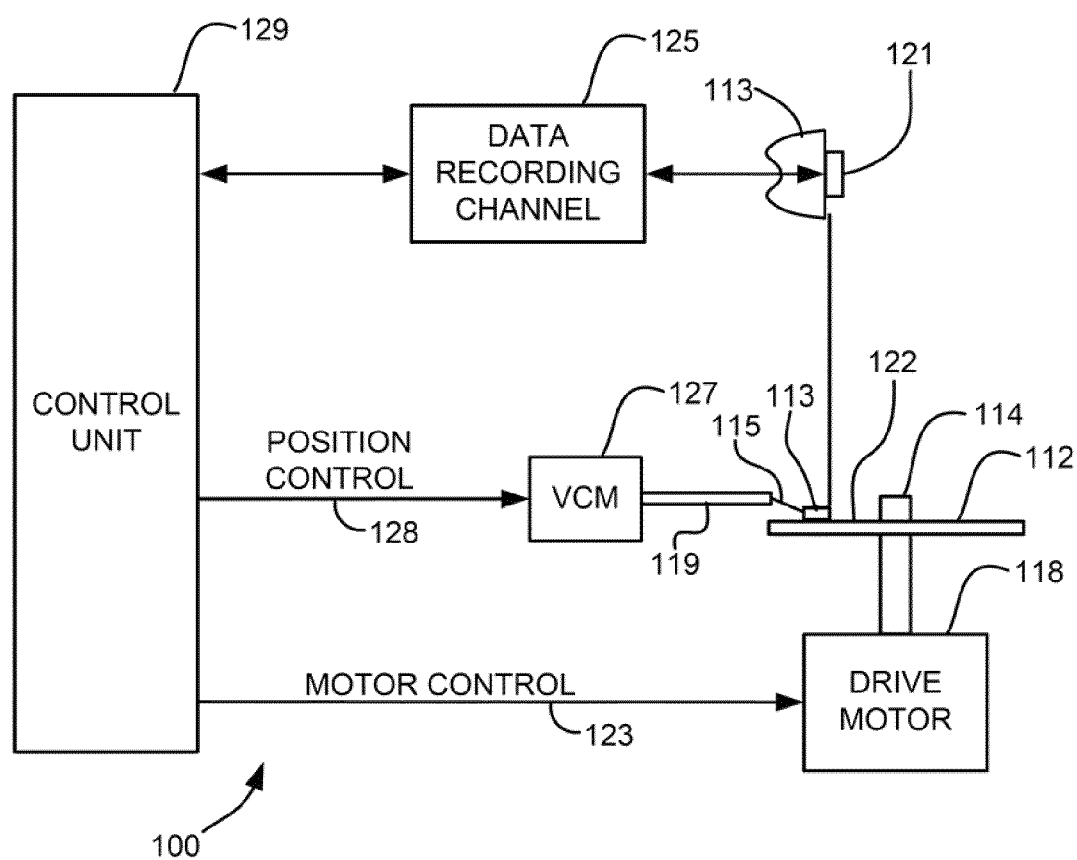
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The fabrication of supporting membranes on top of nanometer-scale structures defined by block copolymer self assembly is an area ripe for innovation. These types of membranes can serve a number of purposes. One such purpose may be to provide mechanical stability to a nanometer-scale self-assembled structure to avoid pattern collapse. Another such purpose may be to have the membrane itself serve as a supporting structure from which to build 3-dimensional and multilayer structures. In both of these cases, these structures open new possibilities for nanometer scale lithography with a wide range of applications, including bit patterned media template fabrication.

In one general embodiment, a structure comprises a plurality of nanostructures extending upwardly from a substrate and a porous membrane extending across upper ends of the plurality of nanostructures.

In another general embodiment, a method comprises forming a block copolymer layer on a substrate, inducing self assembly of the block copolymer layer, selectively degrading a block polymer from the block copolymer layer, forming a porous membrane over the block copolymer layer, and removing a portion of the block copolymer layer for defining a plurality of nanostructures extending upwardly from the substrate after forming the porous membrane over the block copolymer layer.

In yet another general embodiment, a method comprises forming a first block copolymer layer on a first surface modification layer, the first surface modification layer causing the block copolymer layer to become oriented in a first defined way, selectively degrading a first block polymer from the first block copolymer layer, forming a first porous membrane over the first block copolymer layer, removing a portion of the first block copolymer layer for defining a plurality of first nanostructures extending upwardly from the first surface modification layer after forming the first porous membrane over the first block copolymer layer, removing the first porous membrane, depositing a first masking material over the plurality of first nanostructures and the first surface modification layer, removing the plurality of first nanostructures for forming a first patterned mask of the first masking material, forming a second surface modification layer above the patterned mask, forming a second block copolymer layer on the second surface modification layer, the second surface modification layer causing the second block copolymer layer to become oriented in a second defined way different from the first defined way associated with the first surface modification layer, forming a second porous membrane over the second block copolymer layer, removing a portion of the second block copolymer layer for defining a plurality of second nanostructures after forming the second porous membrane over the second block copolymer layer, and removing the second porous membrane.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Recording mediums may differ depending on what type of head is being used to write to the medium. The supporting membrane structures described herein, according to several embodiments and approaches, may provide solutions to prevent pattern collapse in structures defined by self-assembly and provide support to build multilayer stacks of 3-dimensional self-assembled structures which may be used for recording medium production. They can be readily used in the fabrication of bit patterned media templates, according to some embodiments. Previous relevant work in this area includes U.S. patent application Ser. No. 12/141,062 filed Jun. 17, 2008, Ser. No. 12/345,799 filed Dec. 30, 2008, and Ser. No. 12/539,818 filed Aug. 12, 2009, which are hereby incorporated by reference. Conventional granular media may be limited by the superparamagnetic limit to densities on the order of about 1 Tb/in$^2$. One alternative to achieve thermally stable, writable media is by lithographically patterned media. There are two versions of patterned media: one is discrete track media (DTM) where the individual circumferential tracks are patterned and separated by grooves. A second form is bit patterned media (BPM) where individual bits are patterned and isolated by one another. Lithography at the manufacturing level of patterned media (DTM and BPM) will be accomplished by nanoimprint lithography in which one master mold is used to replicate a lithographic mask by imprinting the mold pattern onto each disk. The present application involves methods to fabricate the original master mold for nanoimprint lithography.

According to some embodiments, the nanostructures developed according to the methods described herein may be used as lithography tools in order to create BPM and/or DTM.

For critical dimensions below about 50 nm (especially below about 30 nm), capillary forces during many wet developing processes cause the pattern formed by the undissolved material to collapse, according to observed phenomena. Avoiding pattern collapse is particularly challenging in lamellar phase block copolymers. A supporting porous membrane deposited on top of the block copolymer film before wet developing provides mechanical stability to the structure during the wet developing process, thereby preventing or reducing pattern collapse, though still allowing the selective removal of one block.

A separate challenge from the above described pattern collapse is the difficulty in building 3-dimensional structures by self-assembling materials that may be used for lithographic purposes (e.g., 3-D structures where one of the constituent blocks can be selectively removed). Previous work has demonstrated multilayer block copolymer films. However the structures of the multilayers are not independent from one another and building features for 3-dimensional lithography has been particularly challenging. A thin supporting membrane on top of a self-assembled film provides mechanical support for the first-layer structures and support for building a second self-assembled film, in which the second pattern may or may not be independent from the first-layer pattern in a controlled manner. The process can be repeated for multiple layer 3-dimensional structures.

There are many uses for the supporting membranes described herein. Some of these uses include: 1) supporting membranes to avoid pattern collapse of nanometer structures made by self-assembly; 2) supporting membranes to support 3-dimensional multilayer stacks of self-assembled structures; and 3) use of self-assembled films with supporting membranes for bit patterned media template fabrication. Each of these uses will be described separately.

Supporting Membranes to Avoid Pattern Collapse of Nanometer Structures Made by Self-Assembly Block copolymers are polymeric chains formed by two or more immiscible polymer blocks within the same chain. Free energy minimization induces microphase separation of the immiscible, but bonded blocks resulting in self-assembled periodic and regular patterns. Thin films of block copolymers can form 2-dimensional arrays of regular, periodic patterns on a substrate. Block copolymer chains can be formed by two or more distinct block materials and they can form a wide variety of phase morphologies. The most commonly used structures for lithographic purposes, according to some approaches, are thin films of spherical, cylindrical, or lamellar domains formed by diblock copolymers (block copolymers consisting of only two blocks). For lithographic applications, it is often desirable to use cylindrical or lamellar domains oriented perpendicular to the substrate according to some approaches, as shown in FIG. 2.

Figure 2:
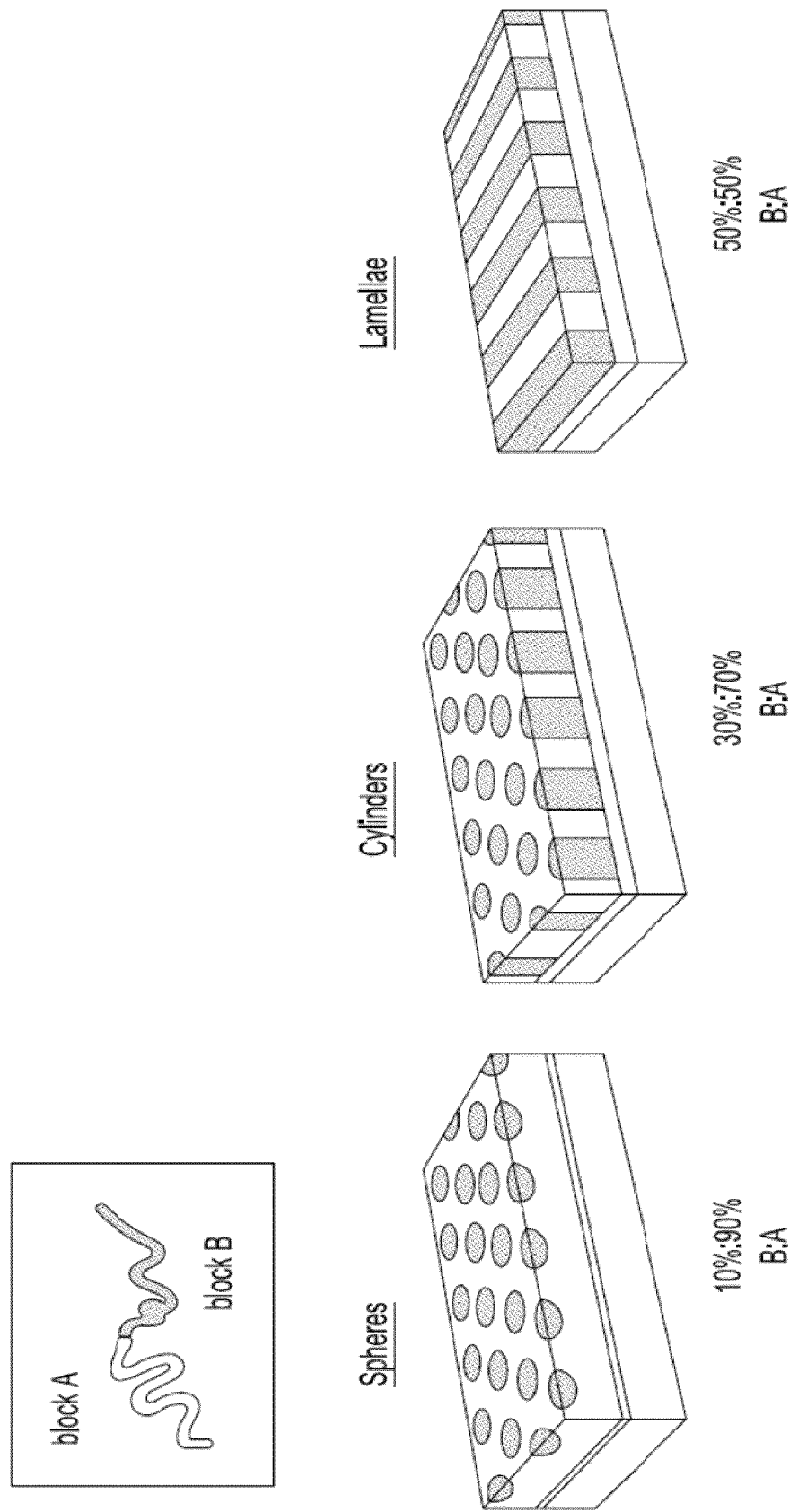
FIG. 2 is a schematic representation of common block copolymer morphologies, according to several embodiments.

FIG. 2 shows a block copolymer thin film made, e.g., by spin coating or dip casting a film from solution onto a substrate, according to several examples. Examples of block copolymer materials include, but are not limited to, polystyrene-block-poly(methyl methacrylate) (PS-b-PMMA), polyisoprene-block poly(ethylene oxide) (PI-b-PEO), polybutadiene-block-poly(ethylene oxide) (PBD-b-PEO), polystyrene-block-poly(ethylene oxide) (PS-b-PEO), poly (methyl methacrylate)-block-poly(ethylene oxide) (PMMA-block-PEO), poly(ethylene oxide)-block-polyethylethylene (PEO-b-PEE), polystyrene-block-poly(vinylpyridine) (PS-b-PVP), polystyrene-block-polyisoprene (PS-b-PI), polystyrene-block-polybutadiene (PS-b-PBD), polystyrene-block-poly(ferrocenyl dimethylsilane) (PS-b-PFS), polybutadiene-block-poly(vinylpyridine) (PBD-b-PVP), and polyisoprene-block-poly(methyl methacrylate) (PI-b-PMMA). Often, but not always, the substrate is previously treated with a surface modification layer to promote a perpendicular orientation of the domains or for chemical pre-patterning for directed assembly. The film is then thermally or solvent annealed to induce microphase separation.

Figure 3:
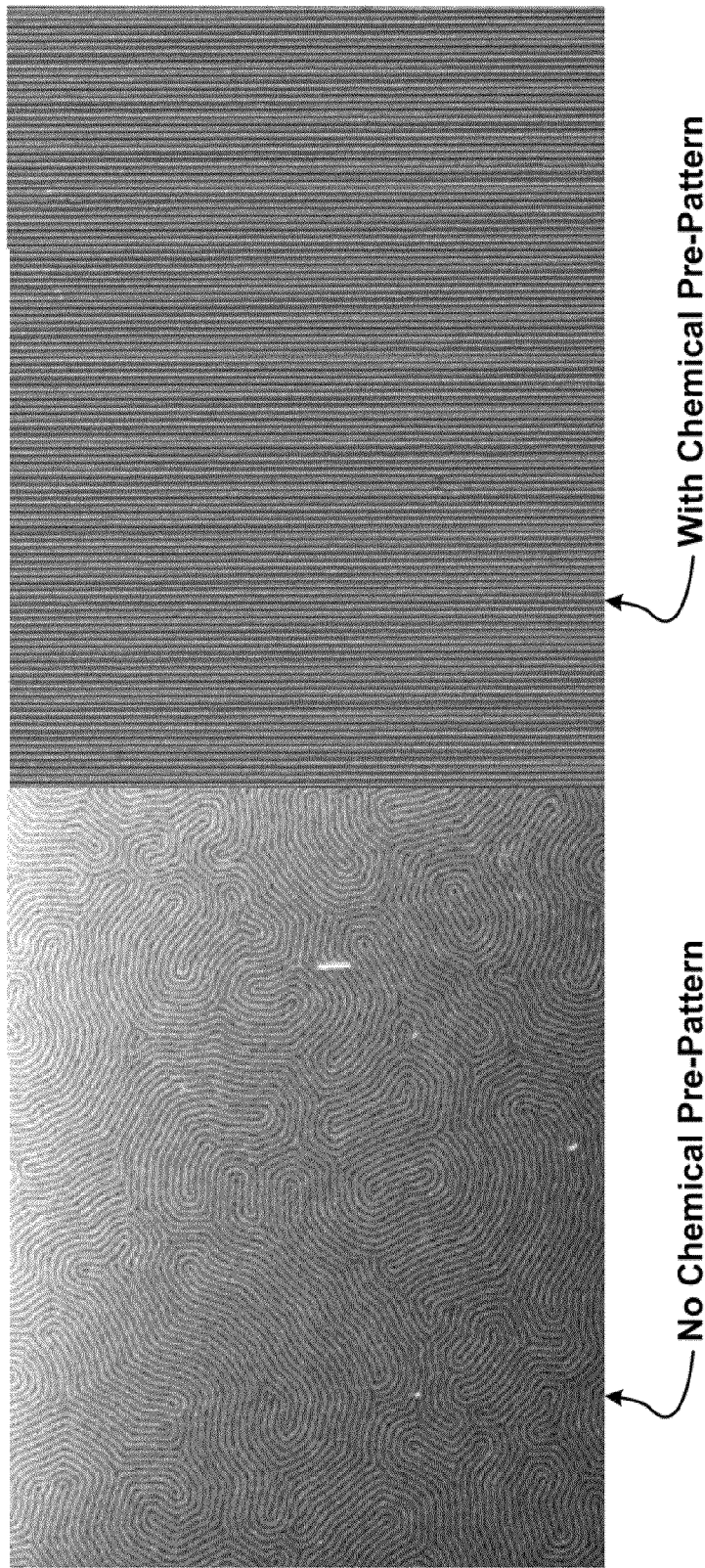
FIG. 3 includes two high-magnification images showing a block copolymer with and without a chemical pre-pattern.

FIG. 3 shows examples of perpendicular lamellar patterns formed by lamellar polystyrene-block-poly(methyl methacrylate) diblock copolymers without chemical pre-patterning, on the left, and with chemical pre-patterning, on the right.

Referring to FIG. 4A, patterns of different nanostructures 402, 404 may be formed on a substrate 408, with or without an etch-stop layer 406. After the plurality of nanostructures are formed, as shown in FIG. 4A, the film may be exposed to radiation in order to induce chain scission in one of the constituent block materials or to cleave the block junction in the case of block copolymers with a cleavable junction, as shown in FIG. 4B. A thin porous film with a thickness ranging from about 0.5 nm to about 5 nm may be deposited across upper ends of the plurality of nanostructures by any deposition method known in the art (such as RF or DC magnetron sputtering, thermal evaporation, electron-beam evaporation, ion beam deposition, etc.), as shown in FIG. 4C, in order to act as a porous membrane 410. The porous membrane 410 material may be, but is not limited to any of the following: Si, $Si_xN_y$, $Si_xO_y$, C, $C_xN_y$, Ta, $Ta_xO_y$, Cr, Al, $Al_xO_y$, W, Mo, Ge, $Ge_xO_y$, etc.

The block copolymer film with the porous membrane 410 on top may be subsequently immersed in a suitable solvent 412 that selectively dissolves the scissioned block (or one of the cleaved blocks in the case of cleavable block copolymers), as shown in FIG. 4D. The solvent 412 penetrates the porous film selectively removing the soluble material 404. Upon drying, the porous membrane 410 remains suspended on top of the undissolved material 402, as shown in FIG. 4E, providing mechanical stability against pattern collapse.

In some embodiments, a structure comprises a plurality of nanostructures 402 extending upwardly from a substrate 408 which may include one or more layers of material, circuitry, etc., and a porous membrane 410 extending across upper ends of the plurality of nanostructures 402.

According to some approaches, the nanostructures 402 may be oriented in a nonrandom pattern, e.g., as a result of chemical pre-patterning on the substrate 408, due to a surface modification layer causing the orientation, etc., as described above where the nanostructures are arranged in a in an ordered stripe pattern across the substrate 408. Many different orientation patterns are capable of being formed, including lines parallel to each other parallel with a plane of the substrate, lines parallel to each other normal to a plane of the substrate, etc.

Figure 6A:
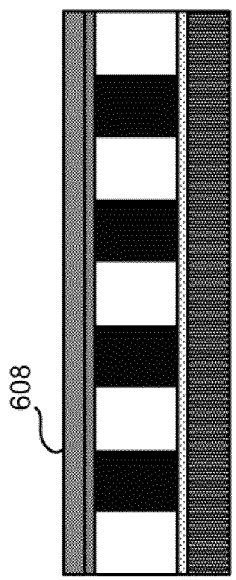
FIGS. 6A-6H are schematic representations of three-dimensional multilayer stack fabrication, according to one embodiment.
Figure 6C:
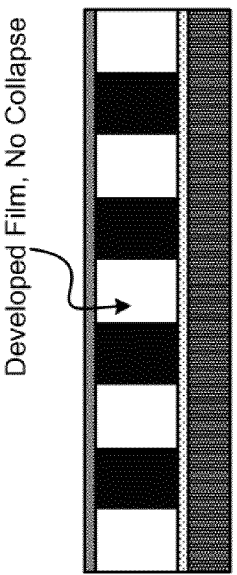
Figure 6B:
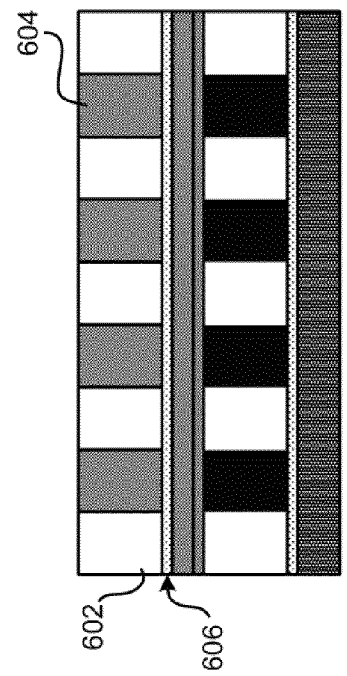
Figure 6D:
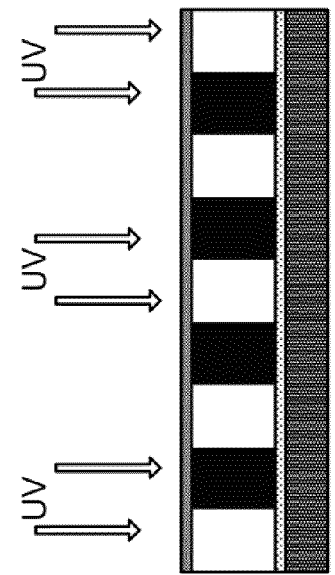
Figure 6E:
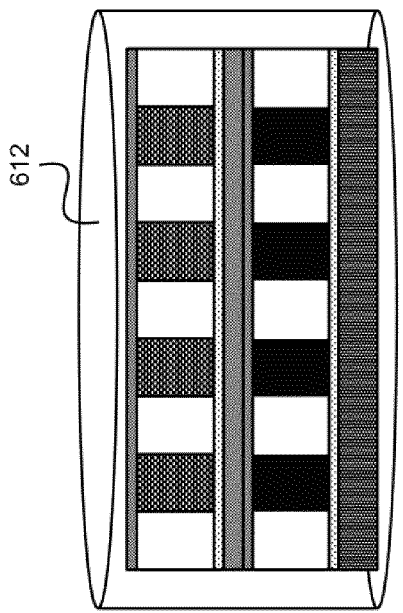
Figure 6G:
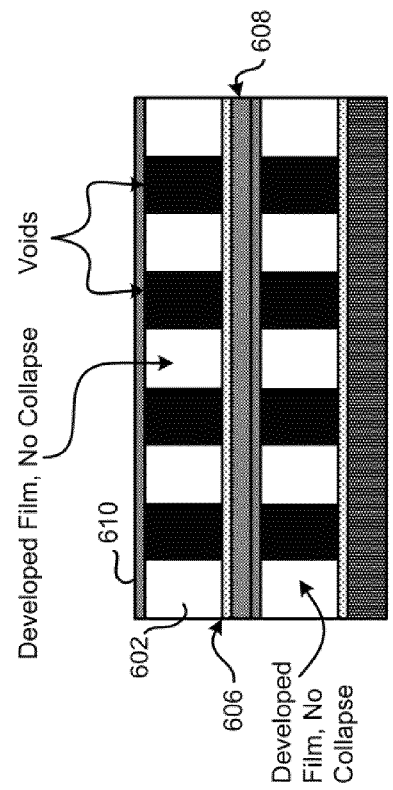
Figure 6F:
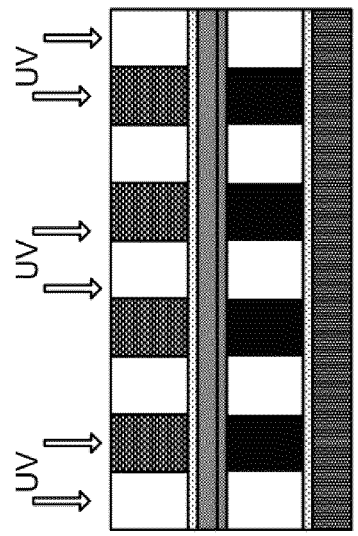
Figure 6H:
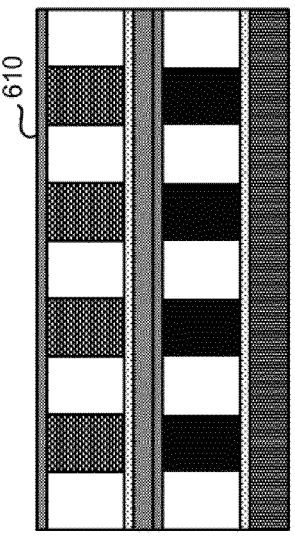

In more approaches, the structure may further include a plurality of second nanostructures formed above the porous membrane, and a second porous membrane extending across upper ends of the plurality of second nanostructures, as shown in FIG. 6H, described in more detail below. Note that further processing may be performed on this structure, such as to add a plurality of third nanostructures formed above the second porous membrane, and a third porous membrane extending across upper ends of the plurality of third nanostructures, in some approaches. More than three nanostructures and/or membranes may be present in some embodiments.

According to more embodiments, an average width of the nanostructures may be less than about 50 nm in a critical dimension thereof (e.g., in a pillar-shaped nanostructure). The critical dimension is the shortest cross-sectional width between sidewalls thereof, wherein an average pitch (center to center distance) of the plurality of nanostructures is within about 1.5 to about 3 times the average width in the critical dimension.

In some approaches, the nanostructures may have an aspect ratio of (deposition) thickness to width in a critical dimension of between about 0.5:1 and about 5:1.

Also, in some embodiments, the nanostructures may be comprised of a block polymer film.

Figure 5A:
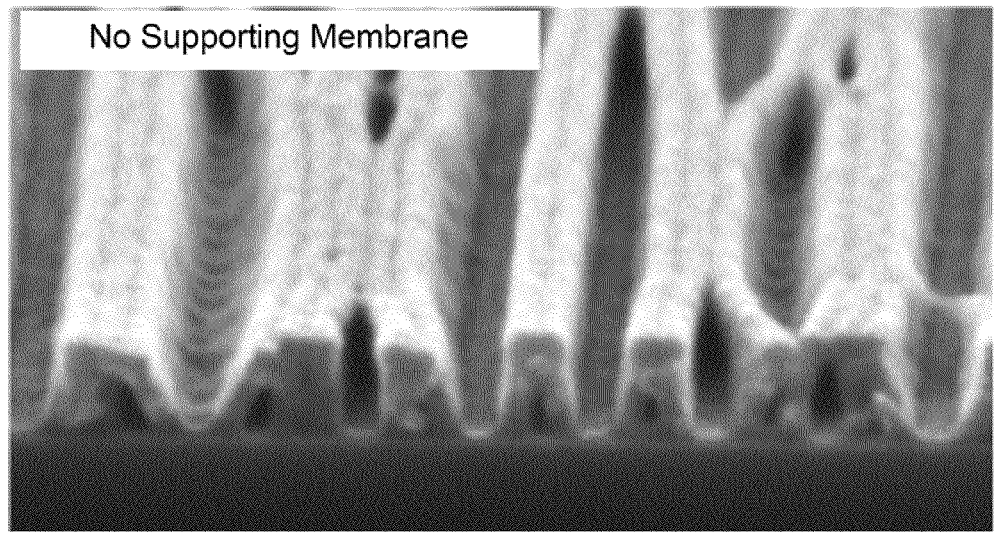
FIG. 5A is a high-magnification image showing an aligned lamellar block copolymer thin film after selective removal of one block copolymer without a supporting membrane, according to one embodiment.
Figure 5B:
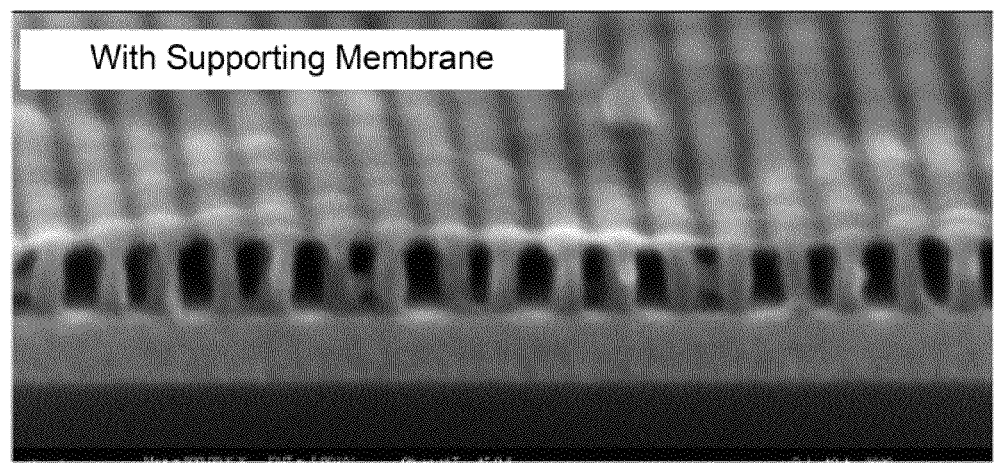
FIG. 5B is a high-magnification image showing an aligned lamellar block copolymer thin film after selective removal of one block copolymer with a supporting membrane, according to one embodiment.

FIG. 5A shows an example of a lamellae-forming PS-b-PMMA block copolymer film after selective removal of PMMA (after scissioning it with UV radiation) without the supporting membrane. FIG. 5B shows an example of a lamellae-forming PS-b-PMMA block copolymer film after selective removal of PMMA (after scissioning it with UV radiation) with the supporting membrane to avoid pattern collapse. If the polymer structure under the supporting membrane is to be used as a lithographic mask, the suspended part of the membrane may be removed, e.g., by a dry etching process such as reactive ion etching or by exposure to radiation. The remaining structure acts as a lithographic mask for additive or subtractive processes.

Supporting Membranes to Support 3-Dimensional Multilayer Stacks of Self-Assembled Structures The suspended membrane 410 of FIG. 4E can also be used to support multilayers of self-assembled films to fabricate 3-dimensional nanostructures. The fabrication of a 3-dimensional stack may use the suspended membrane and underlying structure of FIG. 4E as a starting point, according to some approaches, as shown in FIG. 6A. As shown in FIG. 6C, a dense, non-porous film 608 is deposited on top of the porous membrane to seal it and prevent further material from penetrating the first (bottom) layer. The dense film may be, but is not limited to, any of the following materials: Si, $Si_xN_y$, $Si_xO_y$, C, $C_xN_y$, Ta, $Ta_xO_y$, Cr, Al, $Al_xO_y$, W, Mo, Ge, $Ge_xO_y$, etc., and it may be of the same material as the porous membrane. This dense film becomes a new substrate surface upon which the entire process can be repeated to build a second self-assembled layer on top.

If desired, a surface modification layer 606 may be applied to the dense membrane, and then a second block copolymer film 602, 604 may be deposited on top and annealed (e.g., by thermal or solvent methods) to induce microphase separation on the second film, as shown in FIG. 6D. In order to prevent the first (bottom) lamellar layer from moving during this annealing step, the first lamellar layer may be further cross-linked by UV irradiation, as shown in FIG. 6B to make it stiffer before deposition of the dense non-porous membrane thereon, as shown in FIG. 6C.

The bilayer film may be exposed to radiation to induce chain scission of one of the constituent block materials or to cleave the block junction in the case of block copolymers with a cleavable junction in the second film layer, as shown in FIG. 6E. As shown in FIG. 6F, a second porous membrane 610 may be deposited followed by selective removal of one of the constituent blocks of the second film e.g., using a solvent 612, as shown in FIG. 6G, leading to the formation of a bilayer of PS walls on the substrate, as shown in FIG. 6H. This bilayer of PS patterns is demonstrated in FIG. 7.

Figure 7:
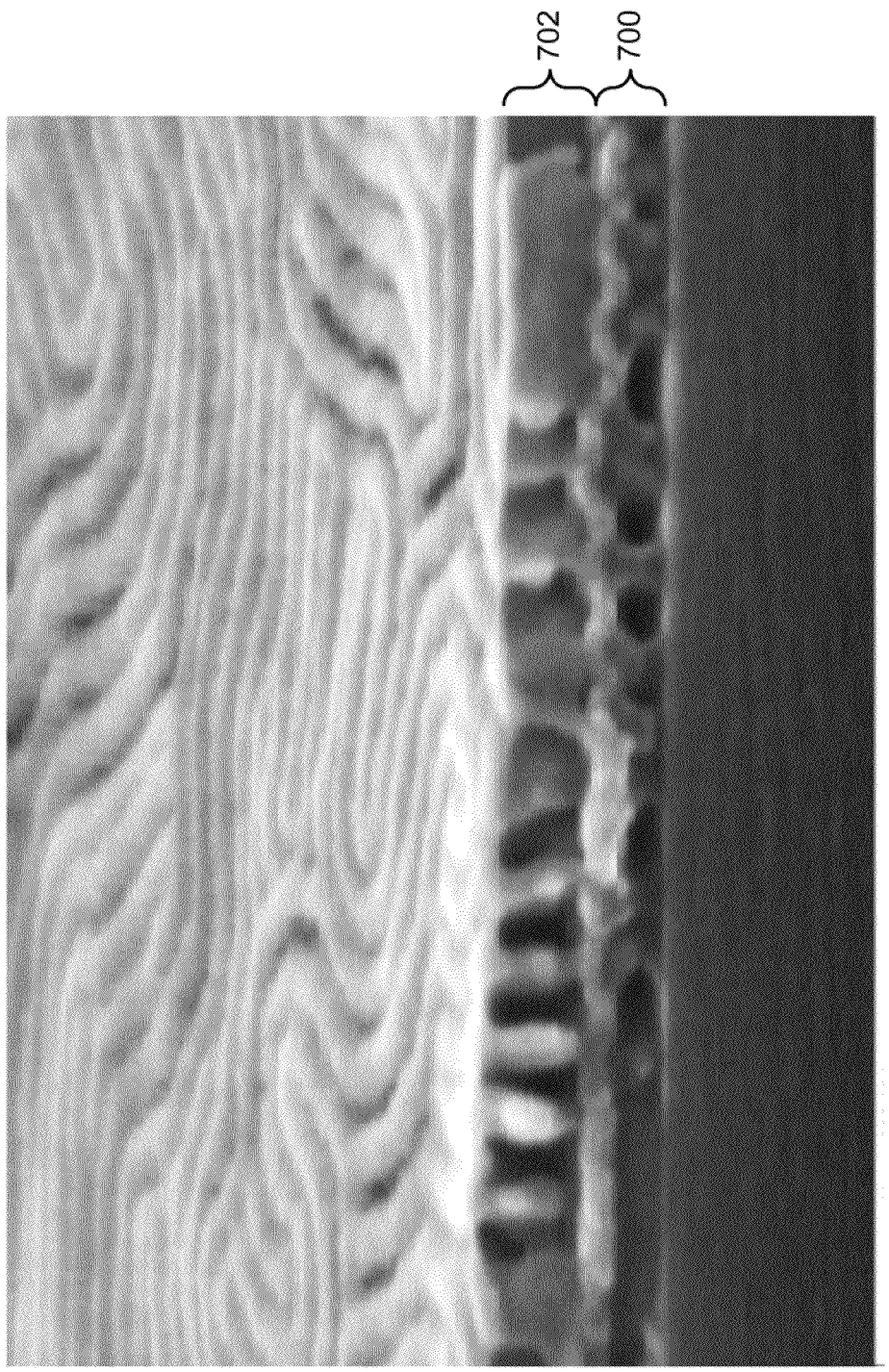
FIG. 7 is a high-magnification image showing a three-dimensional bilayer stack of lamellar thin films. The two layers are separated by a dense, non-porous membrane.

In FIG. 7, the second structure membrane 702 is formed above a first structure 700, each structure 700, 702 including a porous membrane for maintaining rigidity and avoiding pattern collapse. The process can be repeated to form multiple layers of self-assembled films with the possibility of selective removal of one or more constituent blocks from each layer opening new possibilities for 3-dimensional lithographic structures.

The alignment of the block copolymer may be controlled by chemically pre-patterning surfaces prior to application of the block copolymer, often called chemical epitaxy. The first layer may allowed to assemble into a fingerprint pattern of perpendicular lamellae by pre-treating the substrate with a random copolymer comprising styrene and methyl methacrylate substrates, which neutralizes the interactions. Alternatively, the lamellae may be aligned into stripes by chemically pre-patterning polystyrene brushes on the substrate. Similarly, the second PS-b-PMMA layer may also form a fingerprint pattern, independent of the aligned substrate below, by application of a random copolymer brush to the thick membrane layer formed in FIG. 6C, or aligned to an arbitrary pattern formed by patterning a PS brush applied to the thick membrane layer.

Use of Self-Assembled Films with Supporting Membranes for Bit Patterned Media Template Fabrication Self-assembled films with supporting membranes may find multiple applications whenever lithographic processes at the nanometer-scale are used. Bit patterned media (BPM) templates for magnetic storage may readily benefit from the advantages of the supporting membranes on self-assembled films.

Figure 9A:
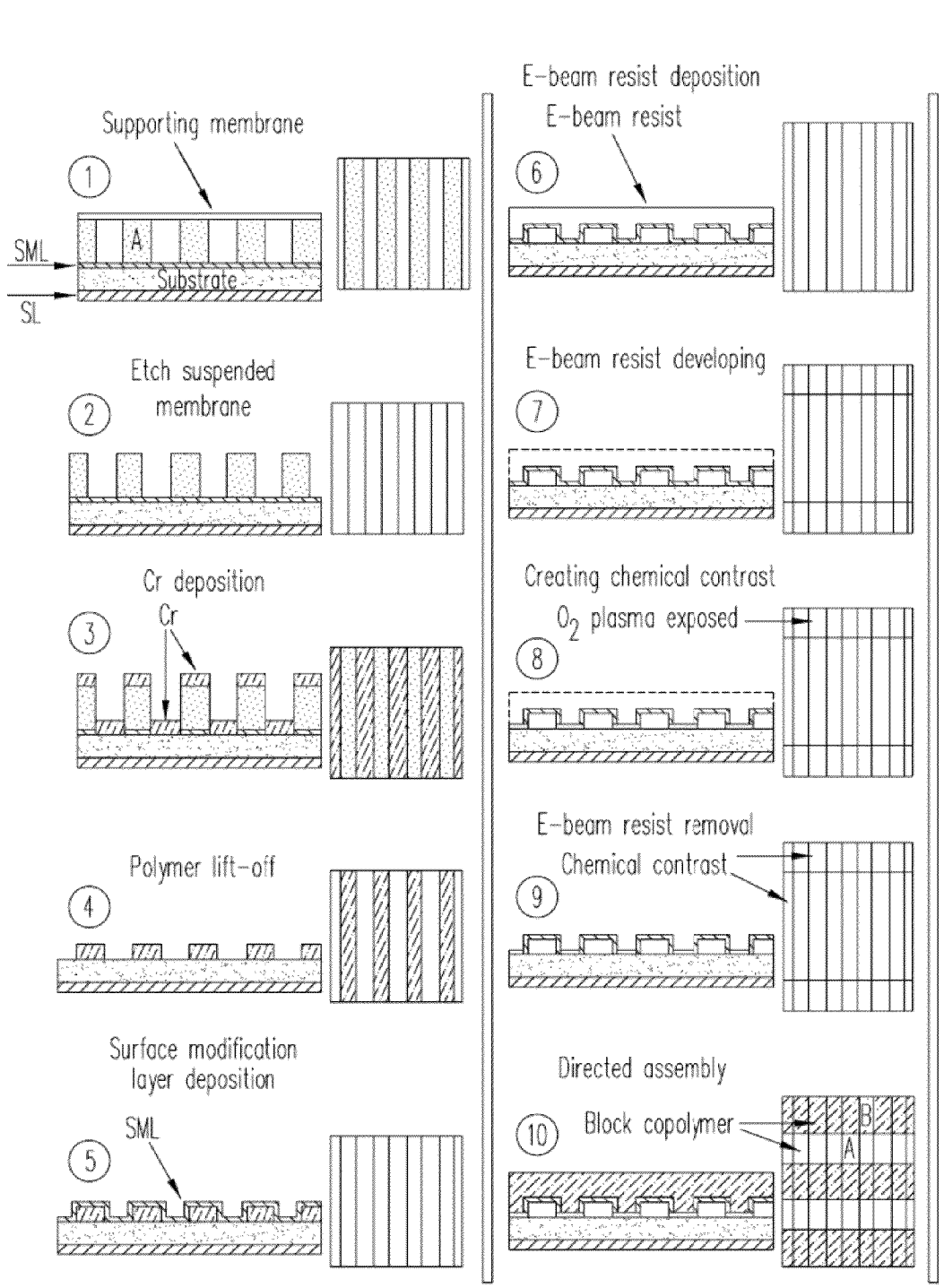
FIG. 9 shows a method progressively from FIG. 9.1 to FIG. 9.18 to fabricate a hole-type template (possibly for producing bit patterned media), according to one embodiment.

In one approach, single-layer self-assembled films with supporting membranes may be used for BPM templates. The structures described previously and shown, according to one embodiment in FIG. 4E, may be used to avoid pattern collapse of lamellar phase block copolymers forming patterns with a full pitch under about 50 nm. The method described previously may be utilized to implement fabrication processes for BPM detailed in previous work, as described above, to prevent pattern collapse. FIG. 9 illustrates the process according to one embodiment.

In FIG. 9, the process starts with generally radial polymer lines with a supporting membrane. These generally radial lines may be defined with a block copolymer as described previously and shown in FIG. 4E. The process illustrated in FIG. 9 comprises the following 18 steps to achieve a master template, according to one approach.

The following description is of one specific embodiment with reference to FIG. 9, where the circled number indicates the a subview of FIG. 9, the left frame in each subview represents a side view, and the right frame in each subview represents a top-down view. In addition to this specific embodiment, a more general description is provided of a method for patterning a structure such as a bit pattern media template.

Generally, a layer of block copolymers are formed on a first surface modification layer of a substrate, the first surface modification layer causing blocks of the block copolymers to become oriented in a defined way. Next, one block is selectively degraded, e.g., by exposure to radiation. Then, a porous membrane is formed over the patterned layer. The block copolymers may be referred to as block A and block B for descriptive purposes.

In subview 9.1 of FIG. 9, the component block B in the radial lines has been selectively removed and the generally radial lines of block A remain with a supporting membrane above.

Generally, a portion of the patterned layer is removed, e.g., using a developer, for defining nanostructures extending upwardly from the substrate after forming the porous membrane over the patterned layer.

In subview 9.2, the suspended membrane is etched by reactive ion etching. An additional etching step may or may not be used to etch through the surface modification layer (SML) to expose the substrate material.

Generally, the porous membrane is removed.

In subview 9.3, a thin layer of an etch-mask material, such as Cr, is deposited. The etch-mask material may be deposited to a thickness of about 1 nm to about 15 nm, in some approaches.

Generally, a masking material is deposited over the nanostructures and substrate using any technique known in the art.

In subview 9.4, polymer film (Block A) is removed. This removal may be accomplished by using oxygen plasma, selective solvent, acid or any other method known in the art. To remove polystyrene, for example, sulfuric acid and hydrogen peroxide may preferably be used.

Generally, the nanostructures are removed for forming a patterned mask of the masking material using any technique known in the art.

In subview 9.5, a monolayer of surface modification layer is deposited (e.g., hydroxyl-terminated polystyrene, by spin coating, annealing and rinsing excess).

Generally, a second surface modification layer is deposited above the masking material using any technique known in the art.

In subview 9.6, e-beam resist (PMMA, ZEP, etc) is spin coated and pre-pattern lines are exposed at a pitch (where $L_s \sim n*L_{o\_Cir}$, and n is an integer equal to or greater than 1, $L_{o\_Cir}$ is the natural pitch length formed by the block copolymer chosen to define the circumferential lines which may not necessarily be of the same pitch nor the same polymer than the one used to define the generally radial lines which have a pitch $L_{o\_Rad}$). In FIG. 9, the generally radial lines and the circumferential lines are chosen such that $L_{o\_Cir}=2*L_{o\_Rad}$, which results in a bit-cell aspect ratio of 2.

In subview 9.7, e-beam resist is developed. As shown, the pitch of the e-beam pre-pattern was chosen such that $L_s \sim 2*L_{o\_Cir}$.

In subview 9.8, the exposed portions of the surface modification layer are chemically altered or removed by reactive ion etching.

In subview 9.9, e-beam resist is removed by using a selective solvent.

In subview 9.10, a block copolymer film is deposited and self assembled (by thermal or solvent annealing). The block copolymer is directed by the chemical contrast pattern underneath and forms a pattern with generally circumferential lines with a periodic pitch of $L_{o\_Cir}$.

Generally, a second layer of block copolymers are formed on the second surface modification layer, the second surface modification layer causing blocks of the block copolymers in the second layer thereof to become oriented in a second defined way different than the defined way of the first surface modification layer.

In subview 9.11, block B is scissioned by radiation (or any other suitable treatment depending on the nature of block B). In the case of a block B made out of PMMA, for example, the sample may be exposed to UV-radiation to cause scissioning.

Generally, one block of the second layer is selectively degraded, e.g., by exposure to radiation.

In subview 9.12, a second porous supporting membrane is deposited by sputtering, thermal evaporation, e-beam evaporation, ion beam deposition, or any thin-film deposition method as known to one of skill in the art. The porous membrane material may be, but it is not limited to, any of the following: Si, $Si_xN_y$, $Si_xO_y$, C, $C_xN_y$, Ta, $Ta_xO_y$, Cr, Al, $Al_xO_y$, W, Mo, Ge, $Ge_xO_y$, etc.

Generally, a second porous membrane is formed over the second patterned layer using any technique known in the art.

In subview 9.13, block B is selectively removed by selective solvent. For example, when block B is PMMA, the PMMA may be selectively removed with acetic acid.

Generally, a portion of the second patterned layer is removed, e.g., using a developer, for defining second nanostructures after forming the second porous membrane over the second patterned layer.

In subview 9.14, the second suspended membrane is etched by reactive ion etching. An additional etching step may or may not be used to etch through the surface modification layer (SML) to expose the substrate material and the radial Cr lines underneath.

Generally, the second porous membrane is removed using any technique known in the art such as reactive ion etching, ion milling, sputtering, etc.

At this point, a mask is defined by the masking material and the second nanostructures. Preferably, however, a second mask is formed as above. In subview 9.15, a thin layer of an etch-mask material is deposited. In some approaches, the thickness of the layer may be from about 1 nm to about 15 nm. An example of an etch-mask material is Cr, though other materials may be used as well.

In subview 9.16, polymer film (Block A) is removed. This removal may be accomplished by using oxygen plasma, selective solvent, acid, or any other removal technique as is known to one of skill in the art. To remove polystyrene, for example, sulfuric acid and hydrogen peroxide may be used.

In subview 9.17, the substrate is etched by reactive ion etching, ion-milling, etc.

In subview 9.18, the etch-mask material (such as Cr, etc.) is removed by an appropriate etch solution (such as a Cr-etch solution, etc.), reactive ion etching, etc.

According to some approaches, portions of the substrate not protected by the first and second masks may be removed, e.g., by ion milling, ion etching, etc. In more approaches, portions of the substrate not protected by the first mask and the second nanostructures may be removed using any technique known in the art.

The substrate may be quartz, Si, magnetic media, or any other suitable material for pattern replication or nano-imprint lithography. The substrate may or may not contain an etch-stop layer (ESL).

Figure 8A:
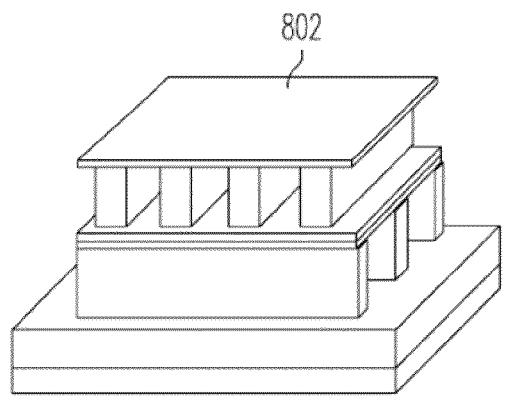
FIGS. 8A-8D show schematic representations of the removal of suspending membranes in a bilayer stack to generate a lithographic mask, according to one embodiment.
Figure 8B:
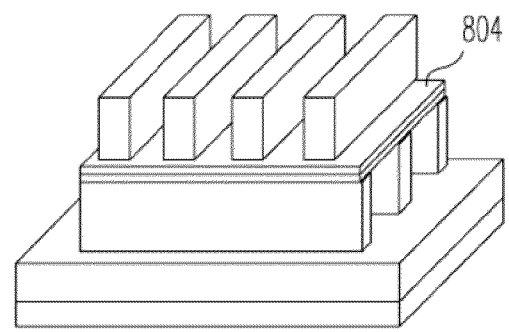
Figure 8C:
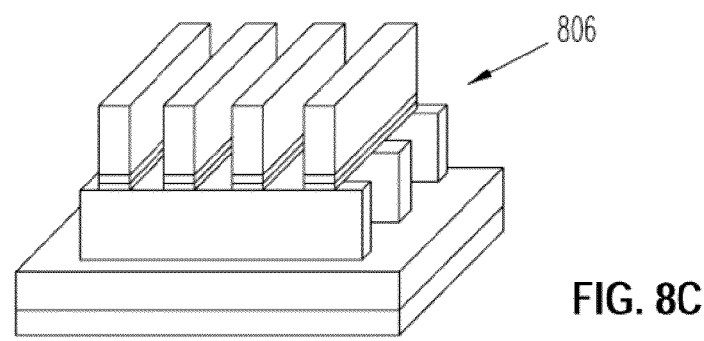
Figure 8D:
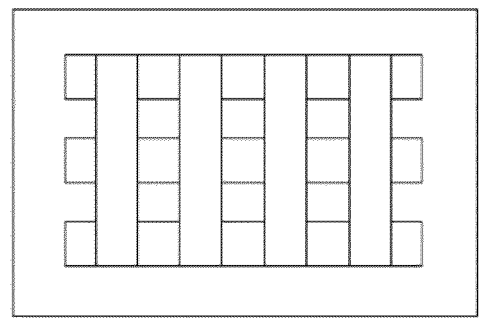

According to even more embodiments, the multilayer structures previously described may also be used to fabricate "hole-type" or "pillar-type" master templates. In order to use the multilayer structures of FIG. 6H as a lithographic mask, the suspending membranes need to be etched away as shown in FIGS. 8A-8D. The top porous membrane 802, as shown in FIG. 8A, is first etched by reactive ion etching (RIE) or ion milling, as shown in FIG. 8B, and a continuing reactive ion etching or milling removes the lower membrane 804, as shown in FIG. 8C. Removal of membrane layers 802, 804, as described, allows for the underlying double-layer polymer monolith 806 to behave as a mask for patterning. Here the stripes of the two patterns are shown aligned orthogonally. The substrate may or may not have an etch-stop layer (ESL). After membrane removal, pattern transfer may be achieved by either subtractive or additive processes. FIG. 8D shows a top view of the structure after removal of the top membrane 802 and lower membrane 804.

In FIG. 10A, the double-layer polymer monolith with layers aligned orthogonally appears as a grid in the top-down view, and in the cross-sectional view the layers are displayed off-set from each other, for clarity. In FIG. 10B, use of the resulting film as an etch resist leads to holes formed in the film, as shown in FIG. 10C as darker regions in top-down view.

Alternatively, in FIG. 10D, deposition of another thin film (for example, but not limited to, Cr) and subsequent lift-off of the polymer leads to Cr in regions that were previously voids. Upon reactive ion etching, regions without Cr are etched, and subsequent Cr removal leaves the substrate with raised regions where there previously were voids in the polystyrene monolith, as shown progressively in FIGS. 10E-10G.

Figure 11:
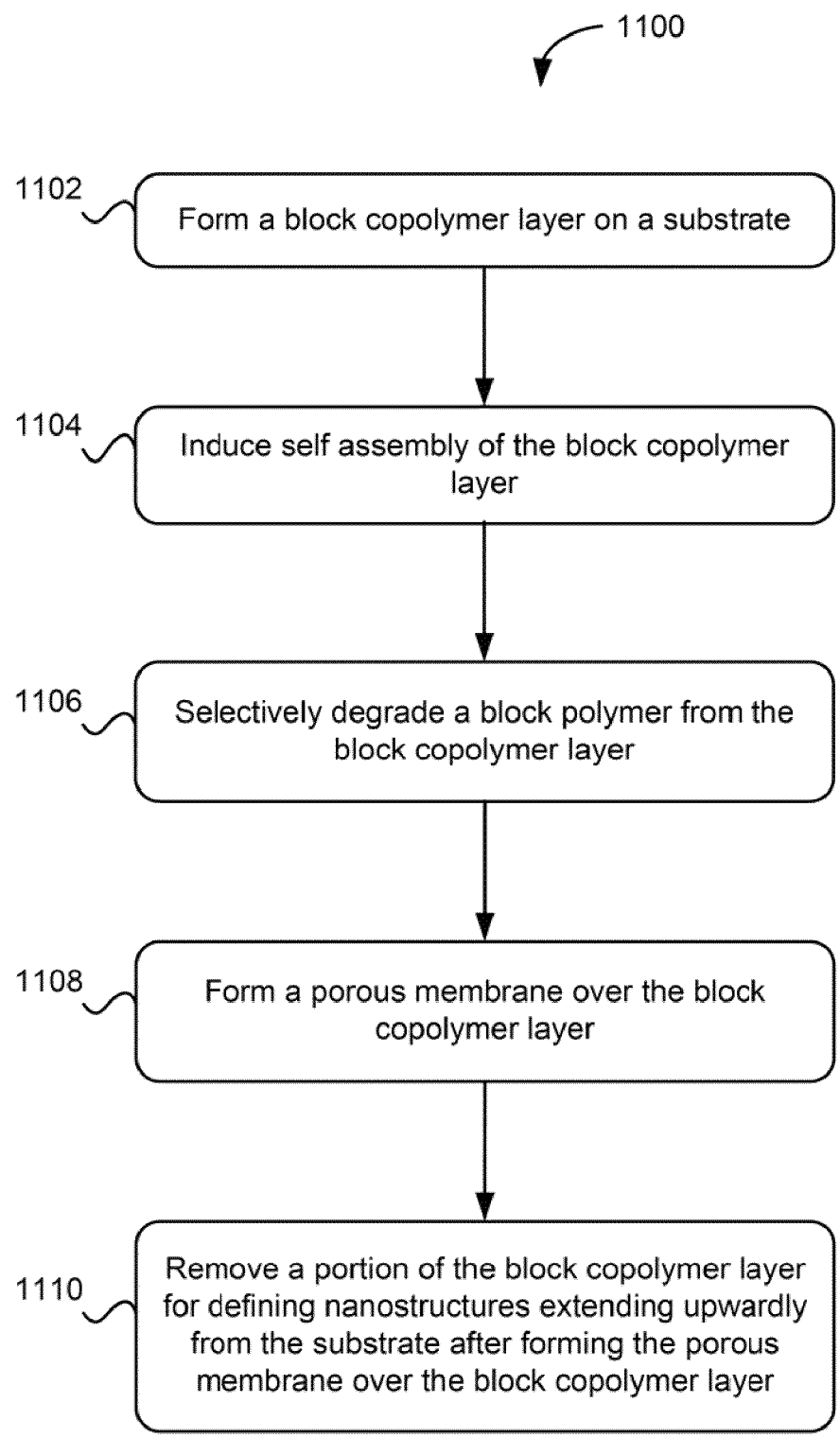
FIG. 11 is a flow chart showing a method according to one embodiment.

Now referring to FIG. 11, a method 1100 is described according to one embodiment. The method 1100 may be carried out in any desired environment, including those described in FIGS. 2-10. In addition, any of the previously described embodiments may be implemented in conjunction with the method 1100 described hereinafter.

In operation 1102, a block copolymer layer is formed on a substrate. According to some embodiments, the substrate may include a surface modification layer, the surface modification layer defining a pattern of the nanostructures. In more embodiments, the substrate may include an etch stop layer.

In operation 1104, self assembly of the block copolymer layer is induced, such as by exposure to a pre-patterned substrate or a surface modification layer which causes orientation of the block copolymer layer.

In operation 1106, a block polymer is selectively degraded from the block copolymer layer, e.g., by exposure to radiation.

In operation 1108, a porous membrane is formed over the block copolymer layer using any technique known in the art, such as RF or DC magnetron sputtering, thermal evaporation, electron-beam evaporation, ion beam deposition, etc.

In operation 1110, a portion of the block copolymer layer is removed, e.g., using a developer, for defining a plurality of nanostructures extending upwardly from the substrate after forming the porous membrane over the block copolymer layer.

In some embodiments, an average width of the plurality of nanostructures may be less than about 50 nm in a critical dimension thereof, e.g., in a pillar-shaped nanostructure, the critical dimension is the shortest cross-sectional width between sidewalls thereof, wherein an average pitch (center to center distance) of the plurality of nanostructures is within about 1.5 to about 3 times the average width in the critical dimension.

According to some more approaches, the plurality of nanostructures have an aspect ratio of (deposition) thickness to width in a critical dimension of between about 0.5:1 and about 5:1.

In some embodiments, the method 1102 may further include removing the porous membrane, e.g., using etching such as reactive ion etching, a selective solvent, etc., to expose a pattern of nanostructures.

According to some additional embodiments, a plurality of second nanostructures may be formed above the previously formed plurality of nanostructures. According to some of these embodiments, the method 1100 may further include forming a nonporous membrane above the plurality of nanostructures. Of course, the nonporous membrane may be formed above the porous membrane. Additionally, a second porous membrane may be formed above the second plurality of nanostructures, and the method 1100 may further include forming a plurality of third nanostructures above the second porous membrane in some approaches. In this or any other approach, portions of the substrate not protected by the first and/or second plurality of nanostructures may be removed.

In some embodiments, a masking material may be deposited over the plurality of nanostructures and the substrate, the plurality of nanostructures may be removed for forming a patterned mask of the masking material, a second masking material may be deposited over the second plurality of nanostructures, the mask, and the substrate, and the second plurality of nanostructures may be removed for forming a second patterned mask of the second masking material.

In these embodiments, the method may further include removing portions of the substrate not protected by the first and second patterned masks, e.g., by ion milling, ion etching, etc.

In another specific embodiment, a method comprises forming a first block copolymer layer on a first surface modification layer, the first surface modification layer causing the block copolymer layer to become oriented in a first defined way, and selectively degrading a first block polymer from the first block copolymer layer. After a block copolymer has been degraded, such as by exposure to UV radiation, a first porous membrane is formed, through any method known in the art, over the first block copolymer layer. A portion of the first block copolymer layer is removed for defining a plurality of first nanostructures extending upwardly from the first surface modification layer after forming the first porous membrane over the first block copolymer layer, and the first porous membrane is removed.

The method also includes depositing a first masking material over the plurality of first nanostructures and the first surface modification layer, removing the plurality of first nanostructures for forming a first patterned mask of the first masking material, forming a second surface modification layer above the patterned mask, and forming a second block copolymer layer on the second surface modification layer, the second surface modification layer causing the second block copolymer layer to become oriented in a second defined way different from the first defined way associated with the first surface modification layer. In addition, a second porous membrane is formed over the second block copolymer layer, a portion of the second block copolymer layer is removed for defining a plurality of second nanostructures after forming the second porous membrane over the second block copolymer layer, and the second porous membrane is removed.

Any of the previously described embodiments may be used in any manner. Some specific uses include implementing the nanostructures for producing BPM and DTM for use in a magnetic data storage system such as a disk drive system. In addition, embodiments may be used for lithography for semiconductor materials, for 3D device integration, for optical devices, photovoltaic cells, membranes for microfluidic applications, etc.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   forming a block copolymer layer on a substrate;
   inducing self assembly of the block copolymer layer;
   selectively degrading a block polymer from the block copolymer layer;
   forming a porous membrane over the block copolymer layer; and
   removing a portion of the block copolymer layer for defining a plurality of nanostructures extending upwardly from the substrate after forming the porous membrane over the block copolymer layer.

2. The method as recited in claim 1, wherein the substrate includes a surface modification layer, the surface modification layer defining a pattern of the plurality of nanostructures.

3. The method as recited in claim 1, further comprising removing the porous membrane.

4. The method as recited in claim 1, further comprising forming a plurality of second nanostructures above the plurality of nanostructures.

5. The method as recited in claim 4, further comprising forming a nonporous membrane above the plurality of nanostructures.

6. The method as recited in claim 5, wherein the nonporous membrane is formed above the porous membrane.

7. The method as recited in claim 4, wherein a second porous membrane is formed above the plurality of second nanostructures, and further comprising forming a plurality of third nanostructures above the second porous membrane.

8. The method as recited in claim 4, further comprising removing portions of the substrate not protected by the plurality of nanostructures and the plurality of second nanostructures.

9. The method as recited in claim 4, further comprising:
   depositing a masking material over the plurality of nanostructures and the substrate;
   removing the plurality of nanostructures for forming a patterned mask of the masking material;
   depositing a second masking material over the plurality of second nanostructures, the patterned mask, and the substrate; and
   removing the plurality of second nanostructures for forming a second patterned mask of the second masking material.

10. The method as recited in claim 9, further comprising removing portions of the substrate not protected by the first and second masks.

11. The method as recited in claim 1, wherein an average width of the plurality of nanostructures is less than about 50 nm in a critical dimension thereof, wherein an average pitch of the plurality of nanostructures is within about 1.5 to about 3 times the average width in the critical dimension.

12. The method as recited in claim 1, wherein the plurality of nanostructures have an aspect ratio of thickness to width in a critical dimension of between about 0.5:1 and about 5:1.

13. A method, comprising:
   forming a first block copolymer layer on a first surface modification layer, the first surface modification layer causing the block copolymer layer to become oriented in a first defined way;
   selectively degrading a first block polymer from the first block copolymer layer;
   forming a first porous membrane over the first block copolymer layer;
   removing a portion of the first block copolymer layer for defining a plurality of first nanostructures extending upwardly from the first surface modification layer after forming the first porous membrane over the first block copolymer layer;
   removing the first porous membrane;
   depositing a first masking material over the plurality of first nanostructures and the first surface modification layer;
   removing the plurality of first nanostructures for forming a first patterned mask of the first masking material;
   forming a second surface modification layer above the patterned mask;
   forming a second block copolymer layer on the second surface modification layer, the second surface modification layer causing the second block copolymer layer to become oriented in a second defined way different from the first defined way associated with the first surface modification layer;
   forming a second porous membrane over the second block copolymer layer;
   removing a portion of the second block copolymer layer for defining a plurality of second nanostructures after forming the second porous membrane over the second block copolymer layer; and
   removing the second porous membrane.

14. The method as recited in claim 13, further comprising:
depositing a second masking material over the plurality of second nanostructures and the second surface modification layer; and
removing the plurality of second nanostructures for forming a second patterned mask of the second masking material.

15. The method as recited in claim 14, further comprising removing portions of the first surface modification layer not protected by the first patterned mask and the second patterned mask.

16. The method as recited in claim 13, further comprising removing portions of the first surface modification layer not protected by the first patterned mask and the plurality of second nanostructures.

* * * * *